(12) United States Patent
Matsumura

(10) Patent No.: US 10,416,814 B2
(45) Date of Patent: Sep. 17, 2019

(54) INFORMATION PROCESSING APPARATUS TO DISPLAY AN IMAGE ON A FLAT SURFACE, METHOD OF CONTROLLING THE SAME, AND STORAGE MEDIUM

(71) Applicant: CANON KABUSHIKI KAISHA, Tokyo (JP)

(72) Inventor: Takeshi Matsumura, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/713,186

(22) Filed: Sep. 22, 2017

(65) Prior Publication Data

US 2018/0088741 A1 Mar. 29, 2018

(30) Foreign Application Priority Data

Sep. 27, 2016 (JP) ................................ 2016-188406

(51) Int. Cl.
| | |
|---|---|
| *G06F 3/042* | (2006.01) |
| *G06T 7/521* | (2017.01) |
| *G06T 7/11* | (2017.01) |
| *G06T 7/70* | (2017.01) |
| *G06F 3/041* | (2006.01) |
| *G06T 7/254* | (2017.01) |
| *H04N 9/31* | (2006.01) |

(52) U.S. Cl.
CPC .......... *G06F 3/0425* (2013.01); *G06F 3/0416* (2013.01); *G06F 3/0428* (2013.01); *G06T 7/11* (2017.01); *G06T 7/254* (2017.01); *G06T 7/521* (2017.01); *G06T 7/70* (2017.01); *H04N 9/3179* (2013.01); *H04N 9/3194* (2013.01); *G06T 2200/04* (2013.01); *G06T 2207/10016* (2013.01); *G06T 2207/10024* (2013.01); *G06T 2207/10028* (2013.01); *G06T 2207/30196* (2013.01); *H04N 9/31* (2013.01)

(58) Field of Classification Search
CPC .... G06F 3/0425; G06F 3/0416; G06F 3/0428; G06T 7/521; G06T 7/11; G06T 7/70
See application file for complete search history.

(56) References Cited

U.S. PATENT DOCUMENTS

2014/0204120 A1* 7/2014 Moteki ................. G06F 3/0416
345/633

FOREIGN PATENT DOCUMENTS

JP 2016-128970 A 7/2016

* cited by examiner

*Primary Examiner* — Lisa S Landis
(74) *Attorney, Agent, or Firm* — Canon U.S.A., Inc. IP Division

(57) ABSTRACT

An information processing apparatus configured to display an image on a flat surface includes a first acquisition unit configured to acquire range information about a distance from an image capturing unit to the flat surface, a second acquisition unit configured to acquire an amount of change in the acquired range information, and a reception unit configured to receive a user input to a screen displayed wherein the reception unit does not receive a user input to a screen displayed in accordance with a predetermined condition about the amount of change acquired by the second acquisition unit in a predetermined region of the flat surface.

12 Claims, 9 Drawing Sheets

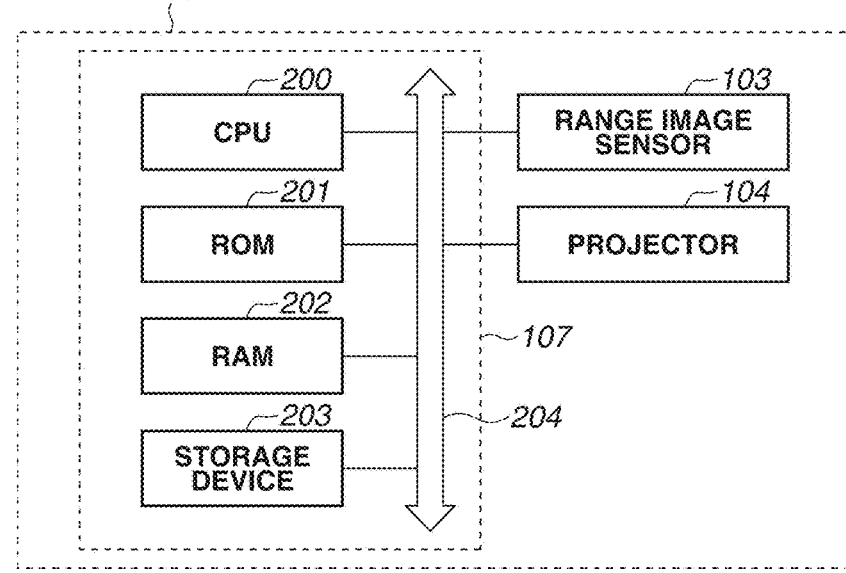
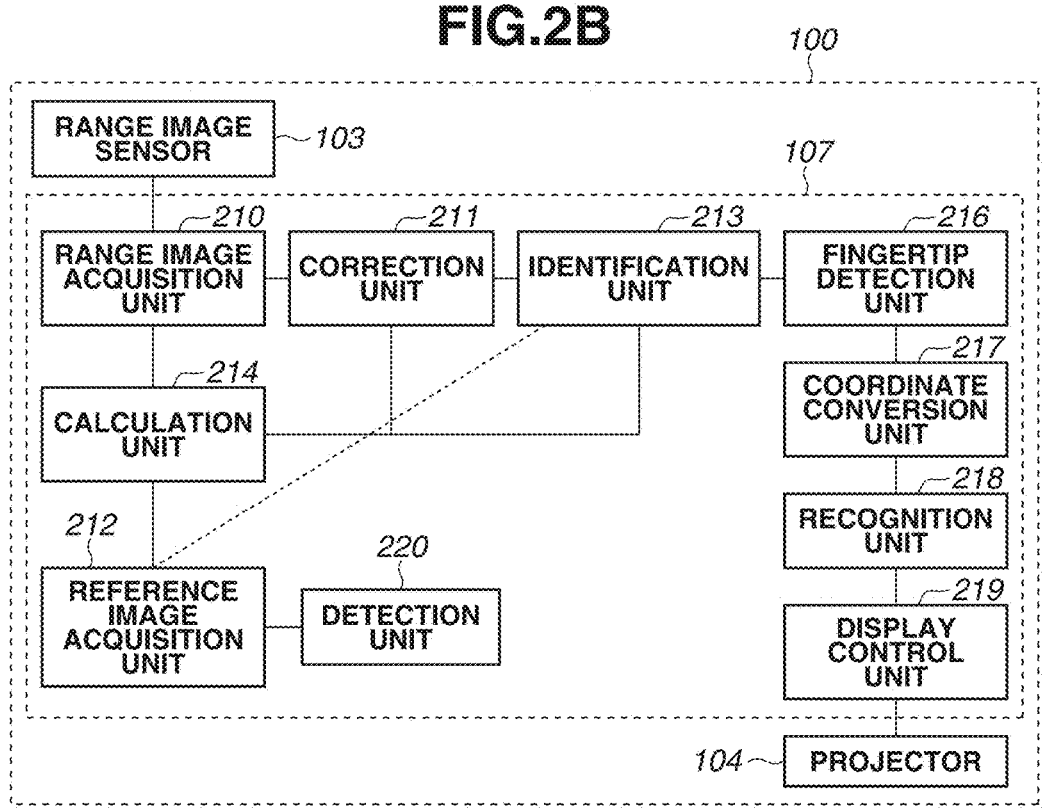

CHANGE AMOUNT
DETERMINATION IMAGE

CHANGE AMOUNT
DETERMINATION IMAGE

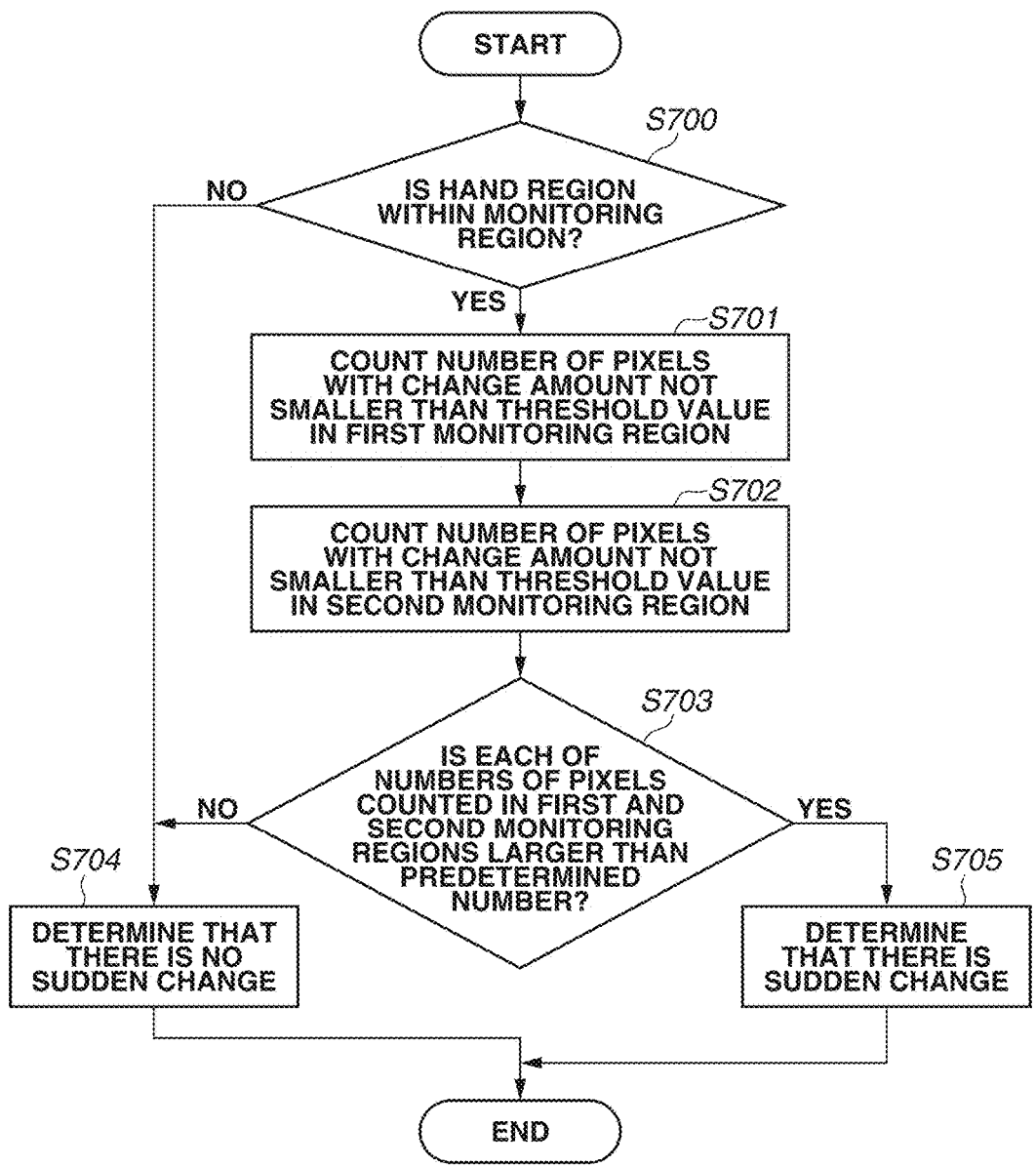

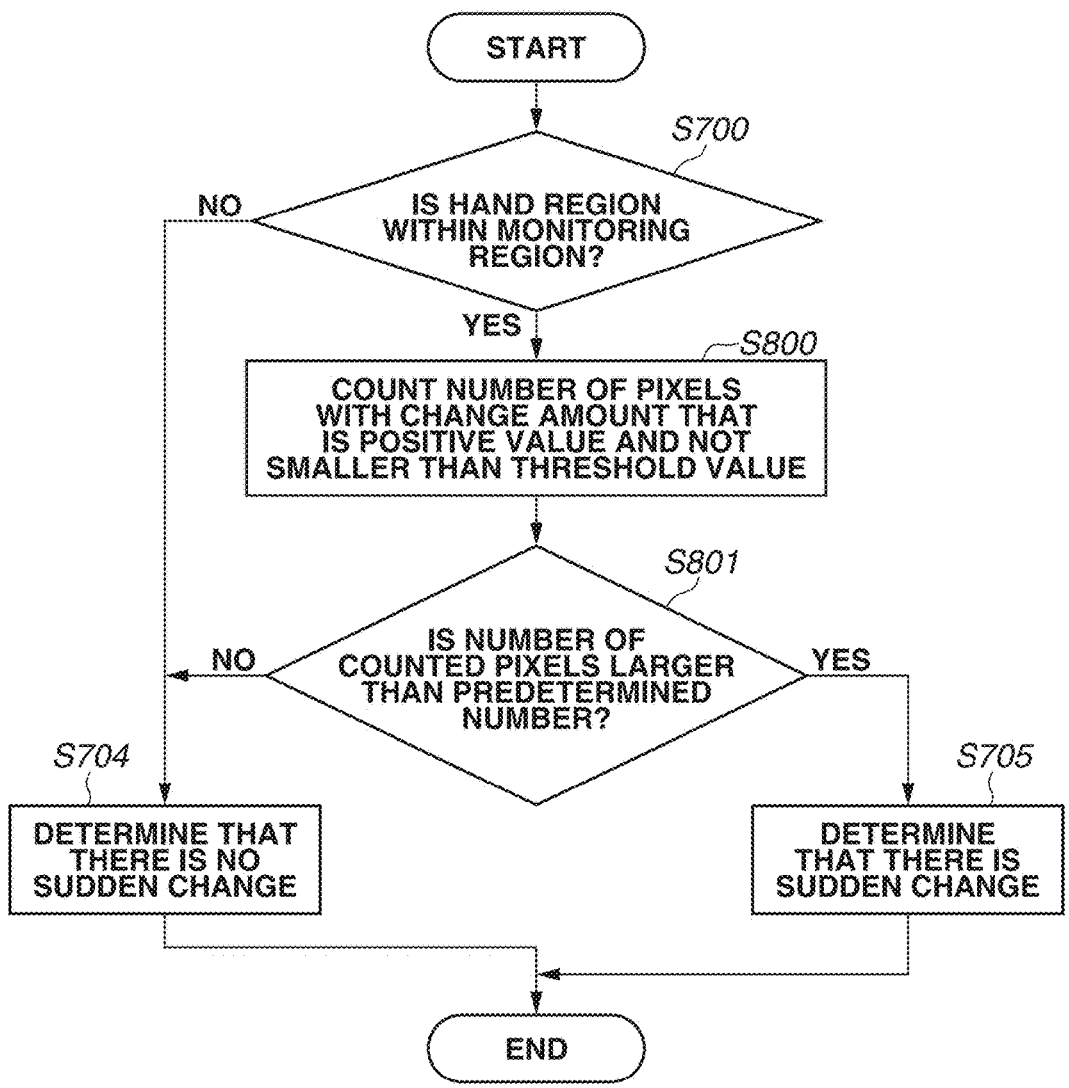

INFORMATION PROCESSING APPARATUS TO DISPLAY AN IMAGE ON A FLAT SURFACE, METHOD OF CONTROLLING THE SAME, AND STORAGE MEDIUM

BACKGROUND

Field of the Disclosure

The present disclosure relates to information processing apparatuses, methods of controlling the same, and storage media.

Description of the Related Art

In recent years, information processing apparatuses capable of projecting a user interface (hereinafter, "UI") onto a flat surface, such as a desk or wall, are discussed. A user can operate the UI projected on the desk by moving a fingertip of the user, such as a touch or release.

Such an information processing apparatus uses a time-of-flight (ToF) range image sensor to detect the distance of a hand or object located between the range image sensor and the flat surface and receives operations.

The information processing apparatus calculates the distance from the range image sensor to an image capturing target object based on images captured by the range image sensor, and acquires the distance between the flat surface and a user's fingertip performing operations. Based on the distance, whether the user's fingertip or the object is in contact with the flat surface is determined.

Japanese Patent Application Laid-Open No. 2016-128970 discusses a technique of setting a predetermined threshold value with respect to the distance between a flat surface and a user's fingertip. In Japanese Patent Application Laid-Open No. 2016-128970, if the distance between the fingertip of the user and the flat surface is smaller than the predetermined threshold value, it is determined that the flat surface is touched, and if the distance is greater than the predetermined threshold value, it is determined that the flat surface is not touched.

A sudden change can occur in a result of detection by the range image sensor due to a change in ambient temperature or environment in which the range image sensor is situated. Such a sudden change is likely to occur in a predetermined region in an image capturing region of the range image sensor. For example, in the case of a range image sensor, such a sudden change is likely to occur in right and left end regions of images captured by the range image sensor.

Such a sudden change in the range image sensor can mislead the information processing apparatus into determining that the position of a hand of a user or an object is changed when there is actually no change in the position of the hand of the user or the object, and the information processing apparatus executes processing which is to be executed at the reception of a touch operation or release operation.

For example, the information processing apparatus may determine that the hand of the user touches the flat surface when the hand of the user is at a predetermined distance or greater from the flat surface, and executes processing which is to be executed at the reception of a touch operation. Further, the information processing apparatus may determine that the hand of the user is removed from the flat surface when the fingertip of the user is still touching the flat surface, and executes processing which is to be executed at the reception of a release operation to change the display on the flat surface.

SUMMARY

According to an aspect of the present invention, an information processing apparatus configured to display an image on a flat surface includes a first acquisition unit configured to acquire range information about a distance from an image capturing unit to each of a plurality of points on the flat surface, a second acquisition unit configured to acquire an amount of change in the acquired range information with respect to each of the plurality of points on the flat surface using range information acquired by the first acquisition unit at a first time and range information acquired by the first acquisition unit after a predetermined time elapses since the predetermined time, and a reception unit does not receive a user input to a screen displayed on the flat surface in accordance with a predetermined condition about the amount of change acquired by the second acquisition unit in a predetermined region of the flat surface.

Further features of the present invention will become apparent from the following description of exemplary embodiments with reference to the attached drawings.

BRIEF DESCRIPTION OF THE DRAWINGS

FIGS. 2A and 2B are block diagrams respectively illustrating the hardware configuration and functional configuration of the information processing apparatus according to the first exemplary embodiment.

FIG. 8 is a flow chart illustrating an example of a process of determining whether there is a predetermined amount of change in the case where there are two monitoring regions according to the first exemplary embodiment.

FIG. 9 is a flow chart illustrating an example of a process of determining whether there is a predetermined amount of change in the case where there is one monitoring region according to the first exemplary embodiment.

DESCRIPTION OF THE EMBODIMENTS

Figure 1:
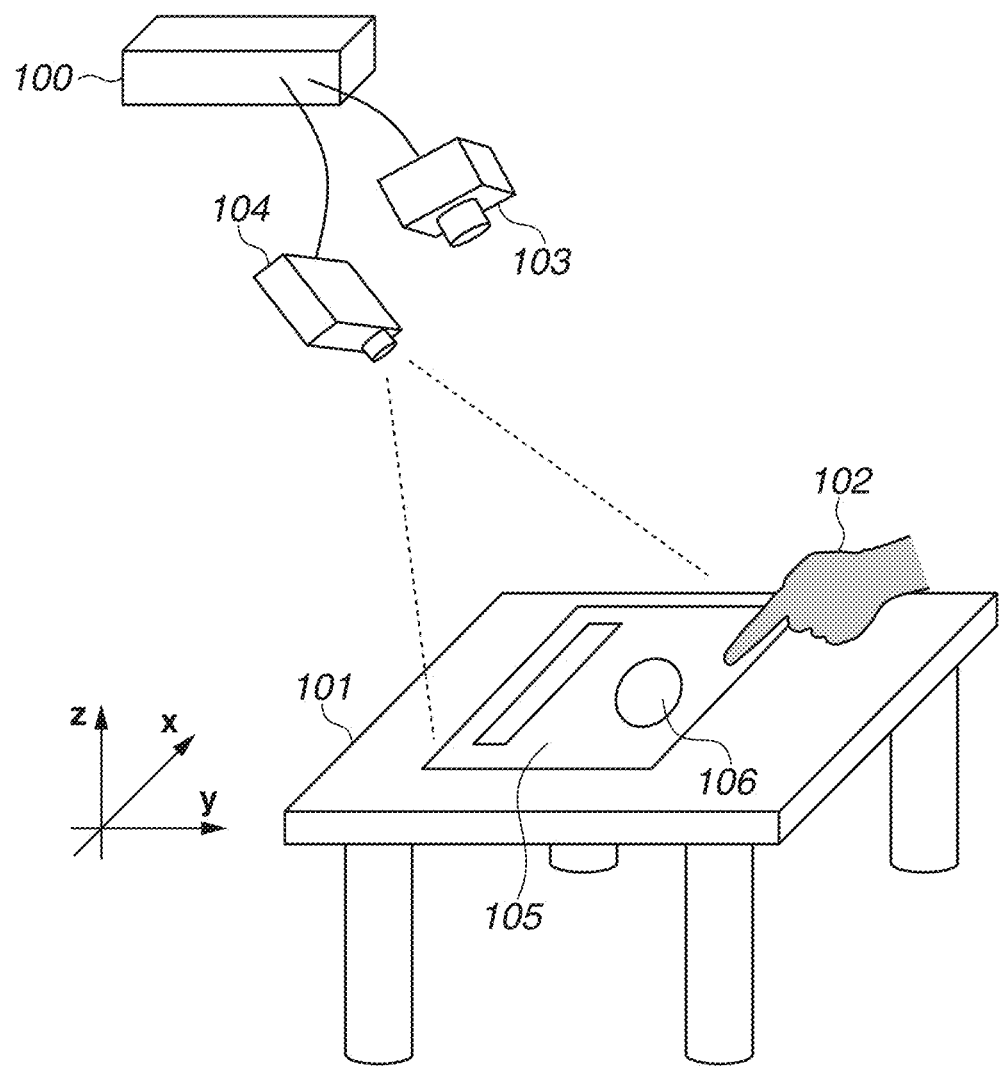
FIG. 1 illustrates an example of the external view of a system using an information processing apparatus according to a first exemplary embodiment.

A first exemplary embodiment will be described below. The following describes an information processing apparatus according to the present exemplary embodiment in detail with reference to the drawings. Configurations described in the following exemplary embodiment are mere examples and are not intended to limit the scope of the present exemplary embodiment.

Further, in the present exemplary embodiment, the term "touch" refers to an operation of bringing a fingertip into contact with or near the top of a flat surface, such as a table, or a display region of an item projected on the surface to start input to the flat surface and the item. The term "release" refers to an operation of removing the fingertip having been brought into contact with or near the flat surface and the item after the touch to end the input to the object and the item.

The information processing apparatus according to the first exemplary embodiment is capable of recognizing various user operations, such as "tap", "move", and "flick", based on the position, movement, speed, and other conditions of a fingertip from a touch to a release. For example, a series of input operations of touching a flat surface with a fingertip and releasing the fingertip immediately after the touch with substantially no movement along the flat surface is referred to as "tap". In the present exemplary embodiment, an information processing apparatus configured to recognize a tap as input for selecting a user interface (UI), recognize a tap on an item projected on a flat surface, and provide feedback to the user will be described as an example. The information processing apparatus recognizes that an item is selected in response to a tap, and provides feedback to the user by changing a color of the selected item and switching a UI projected on the flat surface.

In the present exemplary embodiment, the flat surface includes no touch sensor, and user operations are recognized on the surface of an object, such as a desk, as the flat surface. In the present exemplary embodiment, a range image sensor is used to acquire a range image containing range information about the distance from the range image sensor to each of the fingertip, touch pen, and flat surface.

The term "range image" refers to an image containing information, as a pixel value, corresponding to the distance along the depth direction of the image from a reference position (e.g., the center of a lens of an image capturing unit) to the subject to be imaged. In the present exemplary embodiment, a range image containing range information for each pixel is described. Alternatively, any method can be used as long as an image captured by the range image sensor can be divided into a plurality of regions and range information can be acquired for each of the plurality of regions. In the present exemplary embodiment, a time-of-flight (ToF) range image sensor is used as the image capturing unit that captures the range image. The ToF range image sensor performs range measurement based on a difference in time (phase difference) during which laser light emitted from the sensor is reflected by the subject to be imaged and returns. While the ToF range image sensor is used in the present exemplary embodiment, any device capable of detecting the distance from the range image sensor to the subject to be imaged can be used. For example, a pattern light projecting infrared sensor or stereo camera can be used.

In the present exemplary embodiment, the case where a fingertip of one hand of a user taps on a UI projected and displayed on a table, i.e., a flat surface, by the information processing apparatus including the range image sensor and a projector will be described as an example.

User operations are recognized based on range images captured by the range image sensor of the information processing apparatus. The image capturing unit corresponds to the range image sensor, the table onto which the projector projects the UI corresponds to the flat surface, and the hand of the user corresponds to an object located between the image capturing unit and the flat surface. While the case where operations are performed with the hand of the user will be described below, operations can also be performed by an object such as a stylus or robot arm. Further, the present exemplary embodiment is also applicable to the case where an object other than hands is placed on the table as the object located between the image capturing unit and the flat surface. Further, the flat surface is not limited to the tables and can be an upright flat surface such as a screen or whiteboard.

[External View of Information Processing Apparatus]

FIG. 1 illustrates an example of the external view of an information processing apparatus 100 according to the present exemplary embodiment. The coordinate axes of the world coordinate system defining positional information in a three-dimensional space is set as illustrated in FIG. 1.

A flat surface 101 is a portion of a table onto which a projector 104 projects a UI image 105, and a user performs a tap by touching the flat surface 101 with a fingertip of a hand 102 and then releasing the fingertip.

According to the present exemplary embodiment, a range image sensor 103 configured to capture images of the flat surface 101 from above is situated above the flat surface 101. The range image sensor 103 captures at regular time intervals a range image containing range information indicating the distance from the range image sensor 103 to an object to be imaged. Then, information about the depth direction of the captured range image is used to recognize a user operation such as a tap.

The information processing apparatus 100 extracts from the captured range images a region in the foreground that is located at a predetermined distance or greater from the flat surface 101 to detect the hand 102 of the user located in the space above the flat surface 101. According to the present exemplary embodiment, a region in the foreground that is located at the predetermined distance or greater from the flat surface 101 is determined as a hand region.

Further, the coordinates corresponding to the fingertip in the hand region corresponding to the hand 102 detected from the captured range image and the distance of the fingertip are calculated to calculate the position of the fingertip in the world coordinate system.

According to the present exemplary embodiment, the user taps an item 106 contained in the UI image 105 projected on the flat surface 101. If the information processing apparatus 100 detects a tap operation based on the images captured by the range image sensor 103, the projector 104 changes the color of the projected item 106 or changes the screen to another screen.

The positional relationship between the flat surface 101 and the range image sensor 103 can be any positional relationship arranged such that images of a top view of the flat surface 101 are obtained. Thus, the range image sensor 103 does not have to be situated above the flat surface 101. For example, a mirror can be situated above the flat surface 101, and an image on the mirror is captured by the range image sensor 103 from below so that the captured image has an angle of view which is a top view of the flat surface 101.

As in the case of the range image sensor 103, the configuration of the projector 104 can be any configuration that enables projection onto the flat surface 101, and the projector 104 does not have to be situated above the flat surface 101. For example, projection light projected toward a different direction can be reflected using a mirror to project the light onto the flat surface 101.

Alternatively, a visible light sensor or infrared sensor can be situated above the flat surface 101 in order to increase the accuracy of hand region detection. The accuracy of hand region detection may be improved by extracting and using flesh color regions contained in images captured by the visible light sensor. In the flesh color extraction, it is desirable to limit color tones and light quantity of the UI image 105 projected and displayed on the projector 104. Alternatively, the projection cycle of the projector 104 and the image capturing cycle of the visible light sensor are synchronized to switch between the projection and the image capturing quickly enough not to allow the user to visually recognize the switch so that the hand region detection based on the flesh color extraction is performed without being affected by the projection light. Alternatively, for example, pixels that are significantly different in luminance from the flat surface 101 are detected as a hand region based on infrared images captured by the infrared sensor.

[Configuration of Apparatus]

FIG. 2A illustrates the hardware configuration of the information processing apparatus 100 according to the present exemplary embodiment. A control unit 107 controls the entire information processing apparatus 100.

A central processing unit (CPU) 200 executes an operating system (OS) or program stored in a read-only memory (ROM) 201 or a storage device 203 using a random access memory (RAM) 202 as work memory to perform computation and logical determination of various types of processing to control units connected to a system bus 204. Examples of processing performed by the CPU 200 include range image correction processing and touch input recognition processing described below.

The storage device 203 can be a hard disk drive or an external storage device connected via various interfaces, and stores programs and various types of data for the correction processing and the recognition processing according to the present exemplary embodiment.

The range image sensor 103 captures range images of the space including the flat surface 101 and the hand 102 of the user above the flat surface 101 according to the control performed by the CPU 200, and outputs the captured range images to the system bus 204. While a method using ambient light or infrared light having little effect on the projection and display on the flat surface 101 is described as a method of capturing range images in the present exemplary embodiment, a parallax method or the like can be used in place of the above-described method.

The projector 104 projects and displays on the flat surface 101 the UI image 105 containing the item 106 to be operated or feedback in response to a tap operation according to the control performed by the CPU 200.

FIG. 2B is a block diagram illustrating an example of the functional configuration of the information processing apparatus 100 according to the present exemplary embodiment. The CPU 200 develops a program stored in the ROM 201 into the RAM 202 and executes processing according to a flow chart described below to realize the functional units. Alternatively, a computation unit or circuit can be used to execute processing of the functional units illustrated in FIG. 2B.

A range image acquisition unit 210 sequentially acquires, as input images, range images with range information contained therein that are captured by the range image sensor 103, and stores the acquired range images in the RAM 202. While signals corresponding to image data are acquired by the range image acquisition unit 210 and transmitted and received to and from the functional units, this is simply described as "range images are acquired" in the present specification.

A correction unit 211 corrects distance values held by pixels of the range images acquired by the range image acquisition unit 210, based on a correction value image. The correction value image is an image holding values for correcting the distances of pixels of range images that are stored in the pixels. A correction value image calculation method will be described below.

A reference image acquisition unit 212 acquires a reference image. The reference image is a known range image considered as being acquired when images of the flat surface 101 with no object placed thereon are captured. For example, the reference image is calculated in advance based on lens properties of the range image sensor 103, translation and rotation parameters with respect to the world coordinate system, and information about a flat surface in the world coordinate system that corresponds to the table, i.e., the flat surface 101. The reference image is predetermined and stored in the storage device 203 at the time of shipment in the present exemplary embodiment. The reference image can be updated by a maintenance operation performed by a service engineer or the user. Alternatively, the range image sensor 103 can capture an image of the flat surface 101 with no object placed thereon after the information processing apparatus 100 is turned on, and the captured range image can be used as a reference image.

An identification unit 213 identifies a hand region in range images. The hand region is a region where an image of the hand 102 of the user appears in an input range image. According to the present exemplary embodiment, a difference between the corrected range image and the reference image is calculated for each pixel, and a set of pixels determined as being located in the foreground at a greater distance from the flat surface 101 than a first or second threshold value is identified as a hand region. Details of the first and second threshold values will be described below with reference to FIG. 3.

A calculation unit 214 calculates a difference between the range image and the reference image for each pixel. The differences calculated by the calculation unit 214 are used at the time of generating a correction value image.

A detection unit 220 detects whether there is a sudden change detected by the range image sensor 103 when there is no movement of the object or the hand 102 of the user in the image capturing region. Details of the processing performed by the detection unit 220 will be described below with reference to FIGS. 6 and 8.

A fingertip detection unit 216 detects a position corresponding to the fingertip from the hand region in the corrected range image. According to the present exemplary embodiment, contour points of the hand region are extracted, and the contour points having a curvature that is the most likely curvature of the fingertip are detected as the position of the fingertip. The fingertip position detection method is not limited to the above-described method and, for example, the positions of pixels in the hand region that are located at the greatest distance from the intersection of an end portion of the range image and the hand region can be determined as the position of the fingertip.

A coordinate conversion unit 217 performs processing to convert the fingertip position detected in the corrected range image into world coordinates. According to the present exemplary embodiment, the fingertip position in the range image is converted into world coordinates using the lens properties of the range image sensor 103 and the translation and rotation movement parameters with respect to the world coordinate system. Parameters for converting the coordinates of the fingertip position in the corrected range image based on the range images captured by the range image sensor 103 are preset. The parameters are values that are determined at the time of shipment. The values can be updated by a maintenance operation performed by a service engineer and other persons.

A recognition unit 218 recognizes user operations such as a tap on the flat surface 101 by the fingertip based on the locus of the world coordinates of the fingertip position. According to the present exemplary embodiment, a tap is recognized based on the condition that the elapsed time from when the distance between the fingertip and the flat surface 101 approaches a predetermined distance or smaller to when the distance becomes the predetermined distance or greater is equal to or shorter than a predetermined value and the amount of movement in the horizontal direction with respect to the flat surface 101 is equal to or smaller than a predetermined value. According to the present exemplary embodiment, the case where the recognition unit 218 detects a tap is described. Alternatively, the recognition unit 218 can be configured to recognize an operation performed with the fingertip of the user other than a tap, such as a move or flick.

A display control unit 219 generates the UI image 105 to be projected and displayed on the flat surface 101 by the projector 104 using information stored in the ROM 201 or the storage device 203, and outputs the generated UI image 105. According to the present exemplary embodiment, the contents of the UI image 105 are changed and displayed in the case where a tap is recognized in a predetermined position (e.g., in the display region of the item 106).

The following describes a process of recognizing a user operation by the information processing apparatus 100 according to the present exemplary embodiment.

Figure 3:
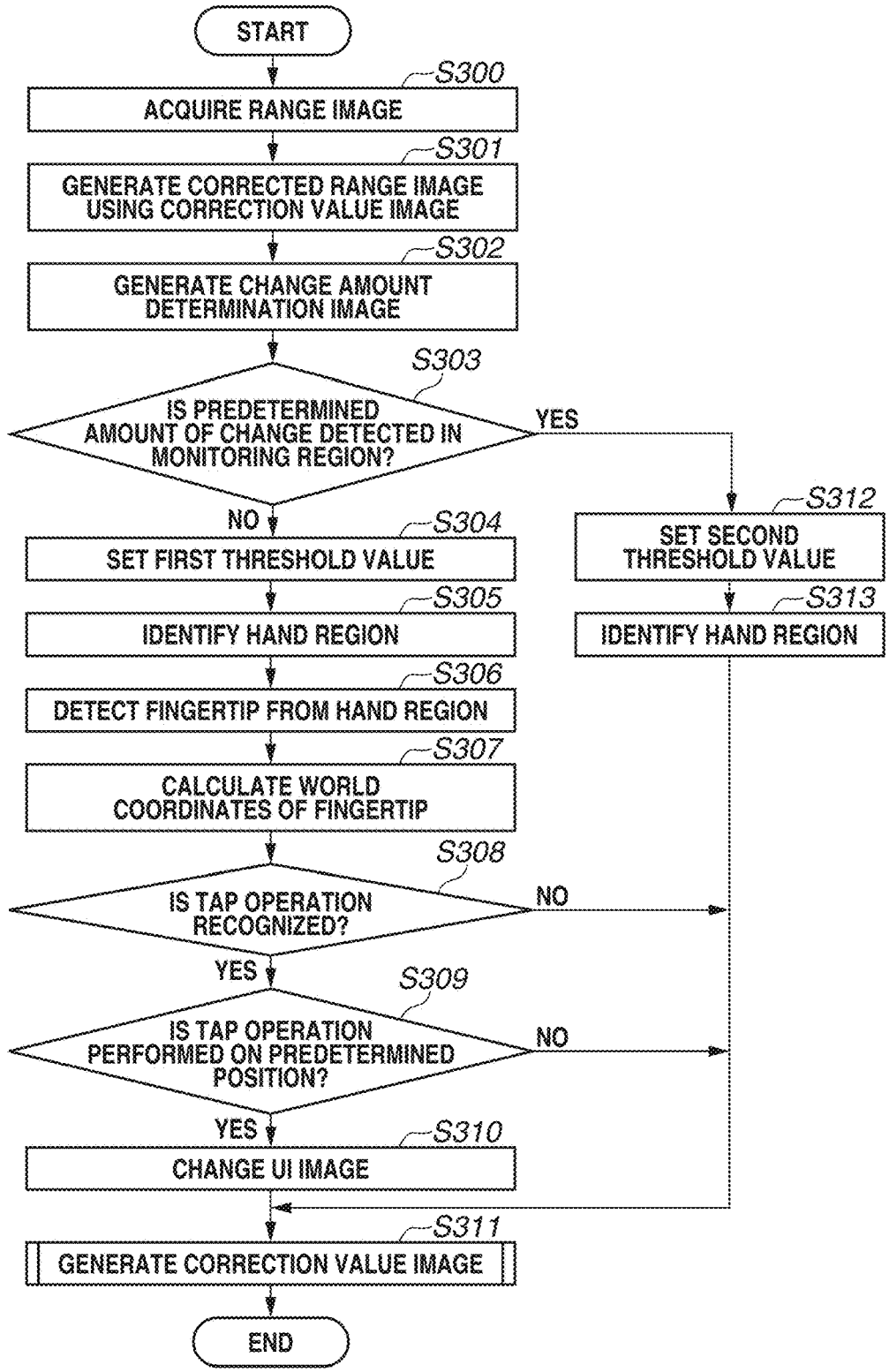
FIG. 3 is a flow chart illustrating an example of a process of recognizing a touch input according to the first exemplary embodiment.

FIG. 3 is a flow chart illustrating a process of recognizing touch input according to the first exemplary embodiment. The case where the user performs a tap to select the item 106 contained in the UI image 105 projected and displayed by the projector 104 will be described as an example. If the information processing apparatus 100 according to the present exemplary embodiment recognizes that the item 106 is selected by the user, the information processing apparatus 100 changes the UI image 105 projected by the projector 104.

Hereinafter, the process illustrated in the flow chart in FIG. 3 will be referred to as "touch input recognition processing". The CPU 200 configuring the functional units of the information processing apparatus 100 develops a program stored in the ROM 201 into the RAM 202 and executes the program to realize the process illustrated in the flow chart in FIG. 3.

The process illustrated in the flow chart in FIG. 3 is started in response to the input of a range image captured by the range image sensor 103 to the information processing apparatus 100. The process illustrated in the flow chart in FIG. 3 is repeatedly executed each time a range image is input from the range image sensor 103. The repeat cycle of the touch input recognition processing corresponds to the frame rate of video images captured by the range image sensor 103.

In step S300, the range image acquisition unit 210 acquires, as an input image from the range image sensor 103, a range image of the space containing the flat surface 101 (table), on which the UI image 105 is projected, and the hand 102 of the user at regular time intervals.

In step S301, the correction unit 211 corrects the range image acquired by the range image acquisition unit 210 based on a correction value image generated with respect to the one frame before in step S311. The correction unit 211 corrects the range image by adding to each pixel value of the input range image a corresponding pixel value of the correction value image. The correction method is not limited to the above-described method and, for example, errors can be corrected by a method using multiplication, division, or subtraction.

While the range image is corrected based on the stored correction value image in step S301, there can be a situation in which no correction value image is calculated and stored for the first frame after the start of the processing by the information processing apparatus 100. The range image acquisition unit 210 acquires the range image prior to the start of the touch input recognition processing and stores the differences between the acquired range image and the reference image as an initial correction value image. This enables appropriate correction of the range image from the first frame in the touch input recognition processing.

In step S302, the calculation unit 214 generates a change amount determination image which indicates the amount of change over time in the distance detected by the range image sensor 103 in the range image detected by the range image sensor 103 from the range image of the previous frame. Details of the process for generating the change amount determination image will be described below with reference to FIG. 6.

In step S303, the detection unit 220 determines whether a predetermined amount of change is detected in a monitoring region of the change amount determination image generated in step S302. Detecting a predetermined amount of change in step S303 indicates that the range image sensor 103 detects a sudden change when there is no movement of the object or the hand 102 of the user. Details of the processing performed by the detection unit 220 in step S303 will be described below with reference to FIG. 8.

If a predetermined amount of change is not detected in the monitoring region in step S303 (NO in step S303), then in step S304, the detection unit 220 sets the first threshold value as a threshold value for identifying the hand region in the image capturing region. The first threshold value is a threshold value used in the detection of the object or the hand 102 of the user from the images captured by the range image sensor 103. Then, in step S305, the identification unit 213 identifies the hand region from the range image corrected in step S301. In step S305, the identification unit 213 identifies as the hand region a region in the foreground that is located at a greater distance from the flat surface 101 than the first threshold value in the corrected range image. In step S306, the fingertip detection unit 216 detects a fingertip from the hand region identified in step S305. In step S307, the coordinate conversion unit 217 converts the coordinates of the fingertip into world coordinates. According to the present exemplary embodiment, in step S306, the contour points of the hand region are extracted, and the shape of the fingertip is extrapolated from the contour points to calculate the curvature. Based on the curvature, the most likely counter points of the fingertip are identified and detected as the fingertip position. The fingertip position detection method is not limited to the above-described method and, for example, the positions of pixels in the hand region that are located at the greatest distance from the intersection of an end portion of the range image and the hand region can be determined as the position of the fingertip.

In step S308, the recognition unit 218 recognizes a tap on the flat surface 101 by the fingertip based on the locus of the world coordinates of the fingertip position. According to the present exemplary embodiment, a tap is recognized based on the condition that an elapsed time from when the distance between the fingertip and the flat surface 101 approaches a predetermined distance or smaller to when the distance becomes the predetermined distance or greater is equal to or shorter than a predetermined value and the amount of movement in the horizontal direction with respect to the flat surface 101 is equal to or smaller than a predetermined value. A tap is recognized based on the locus of the fingertip position calculated from not a single input image but a series of continuous input images acquired by the range image sensor 103. While the tap operation is described in the present exemplary embodiment, other gesture operations such as a move or flick can be recognized.

In step S309, the recognition unit 218 determines whether a tap is recognized in the region where the item 106 is displayed in the UI image 105.

If a tap is recognized in the display region of the item 106 (YES in step S309), then in step S310, the display control unit 219 changes the UI image 105 to be projected onto the flat surface 101 by the projector 104 and causes the projector 104 to project the changed UI image 105. According to the present exemplary embodiment, the color of an image contained in the UI image 105 is changed. The UI image 105 can be changed not only by changing the color of the item 106 but also by causing the item 106 to blink or changing the UI image 105 to be displayed entirely such that the UI image 105 of different contents is projected by the projector 104.

In step S311, the calculation unit 214 generates a correction value image to be used for the next frame using the corrected range image and the reference image acquired by the reference image acquisition unit 212, and the touch recognition processing on the range image of the present frame is ended. Details of the processing performed by the calculation unit 214 in step S311 will be described below with reference to FIGS. 4 and 5.

The following describes the processing to be performed in the case where the detection unit 220 detects the predetermined amount of change in the monitoring region in the change amount determination image in step S303.

In step S303, if the detection unit 220 detects the predetermined amount of change in the predetermined monitoring region in the change amount determination image (YES in step S303), then in step S312, the detection unit 220 sets the second threshold value as the threshold value for use in hand region detection. The second threshold value is greater than the first threshold value and is also greater than the maximum value of the amount of change in the change amount determination image generated in step S302. Setting the second threshold value as described above prevents recognition of a sudden change detected by the range image sensor 103 as an object when there is no movement of the object or the hand 102 of the user.

In step S313, after the second threshold value is set as the threshold value, the identification unit 213 detects the hand region from the range image corrected in step S301. Then, the processing proceeds to step S311. In step S311, the correction unit 211 generates a correction value image, and the touch input recognition processing is ended.

When the predetermined amount of change is detected in step S303, a sudden change involving no movement of the object or the hand 102 of the user occurs in the result of detection by the range image sensor 103. Thus, in the case where a change occurs in an amount that is greater than the predetermined amount, the information processing apparatus 100 does not recognize an operation and, therefore, does not perform the change of the UI image corresponding to the operation. This prevents a situation that a sudden change detected by the range image sensor 103 is determined as user input when there is no movement of the object or the fingertip by the user and the information processing apparatus 100 executes processing for the item 106 displayed on the flat surface 101.

[Process of Generating Change Amount Determination Image]

Figure 6:
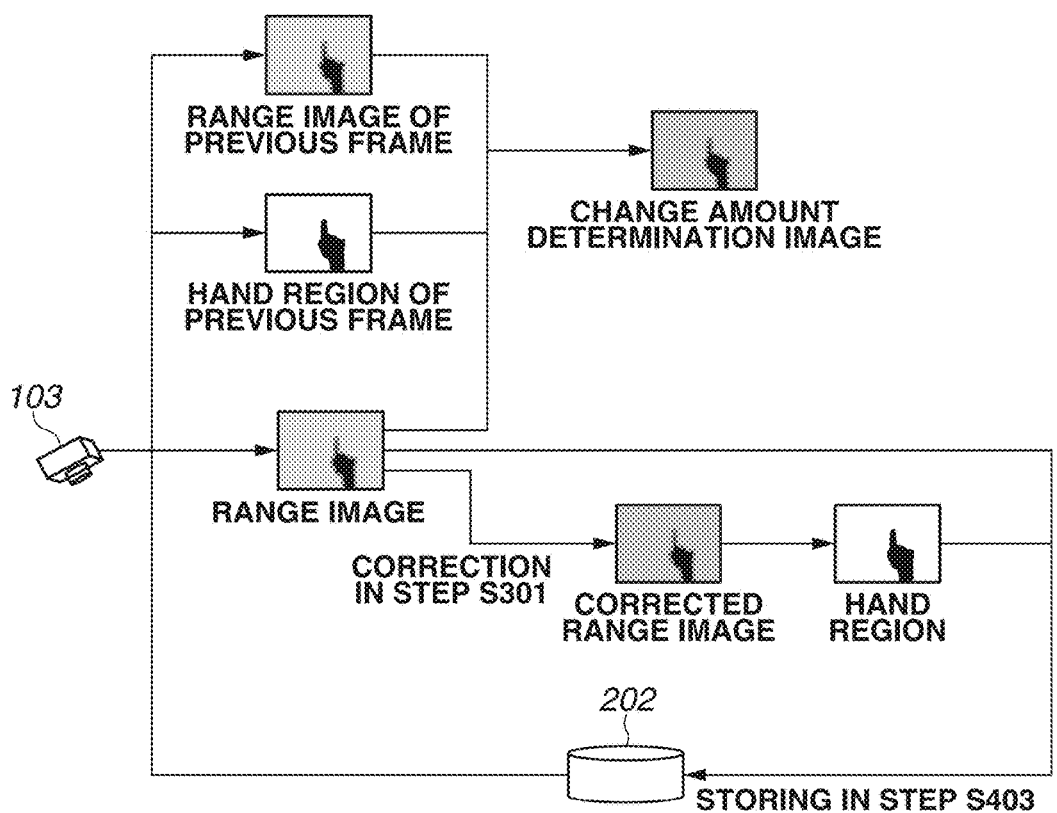
FIG. 6 illustrates an example of a process of generating a change amount determination image according to the first exemplary embodiment.

The following describes the process performed in step S302 by the calculation unit 214 to generate the change amount determination image, with reference to FIG. 6.

The change amount determination image is obtained from the range image of the previous frame, the hand region of the previous frame, and the range image of the present frame.

First, the calculation unit 214 calculates differences between the image captured by the range image sensor 103 in the present frame and the range image of the previous frame. Then, the calculation unit 214 masks the portion of the image acquired by calculating the differences in the distances of the pixels that corresponds to the hand region in the previous frame, and generates a change amount determination image. A sudden change in distance detected in the region in the range image that corresponds to the hand region in the frame before can be presumed to be a movement of the object or the hand 102 of the user. The change amount determination image with respect to the region excluding the region corresponding to the hand region in the frame before is generated so that the information processing apparatus 100 calculates the amount of change in the result of detection of the image capturing region of the flat surface 101.

According to the present exemplary embodiment, the change amount determination image excluding the portion corresponding to the hand region in the one previous frame is generated. Alternatively, a change amount determination image can be generated by calculating for each pixel a difference between the range image of the previous frame and the range image of the current frame without the use of the image in which the hand region is masked.

[Description of Process of Calculating Amount of Change in Monitoring Region and Process of Determining Threshold Value for Identifying Hand Region]

Figure 7A:
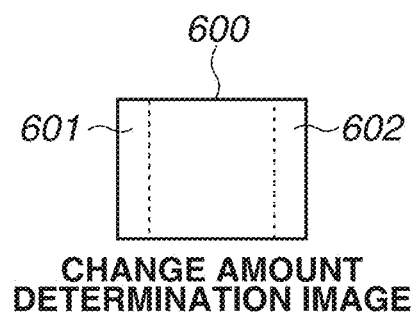
FIGS. 7A and 7B each illustrate an example of a monitoring region in a change amount determination image according to the first exemplary embodiment.
Figure 7B:
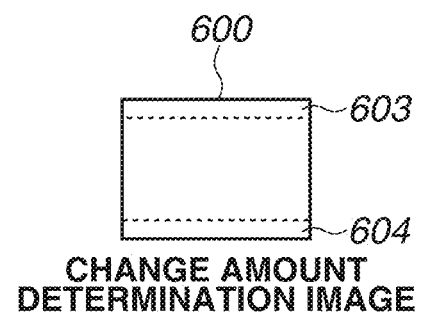

The following describes the process performed by the detection unit 220 in step S303 to determine whether there is a predetermined amount of change in the change amount determination image, with reference to FIGS. 7A, 7B, and 8.

FIGS. 7A and 7B each illustrate a change amount determination image 600 obtained in step S302 and monitoring regions in the change amount determination image. In FIG. 7A, the change amount determination image 600 includes two monitoring regions at right and left ends, respectively, which are a first monitoring region 601 and a second monitoring region 602. The method of setting the first and second monitoring regions 601 and 602 is not limited to the above-described method. As illustrated in FIG. 7B, a first monitoring region 603 and a second monitoring region 604 can be set to the change amount determination image 600. The monitoring regions are not limited to those illustrated in FIGS. 7A and 7B, and a region corresponding to a region where a sudden change involving no movement of the object in the image capturing region of the range image sensor 103 is likely to occur is desirably set as a monitoring region.

FIG. 8 is a flow chart illustrating the process performed by the calculation unit 214 in step S303 in FIG. 3. A program for executing the process illustrated in FIG. 8 is stored in the storage device 203, and the CPU 200 reads and executes the program to realize the process. The following describes the processing with reference to the flow chart illustrated in FIG. 8.

In step S700, the detection unit 220 determines whether the hand region is within the monitoring region. The detection unit 220 identifies the hand region in the corrected range image of the present frame using the threshold value obtained after the execution of step S303 with respect to the previous frame. The detection unit 220 determines whether the identified hand region overlaps the monitoring region in the captured image.

If the detection unit 220 determines that no hand region is within the first monitoring region 601 and the second monitoring region 602 (NO in step S700), then in step S704, the detection unit 220 determines that there is no sudden change that occurs when there is no movement of the object or the hand 102 of the user in the result of detection by the range image sensor 103. In this case, the detection unit 220 executes step S304 and subsequent steps in FIG. 3.

On the other hand, if the detection unit 220 determines that the hand region is within the first monitoring region 601 or the second monitoring region 602 (YES in step S700), the following processing is executed.

In step S701, the detection unit 220 counts the number of pixels with the amount of change in distance in the first monitoring region 601 in the change amount determination image 600 that is a positive value and not smaller than the predetermined threshold value. The positive sign of the amount of change in the distance value of the change amount determination image 600 indicates that the distance from the image capturing unit to the imaged surface in the current frame is longer than the distance from the image capturing unit to the imaged surface in the previous frame.

Next, in step S702, the detection unit 220 counts the number of pixels with the amount of change in distance in the second monitoring region 602 in the change amount determination image 600 that is a negative value and not smaller than the threshold value. The negative sign of the amount of change in the distance value in the previous frame and the current frame indicates that the distance from the image capturing unit to the imaged surface in the frame of this time is shorter than the distance from the image capturing unit to the imaged surface in the previous frame. Specifically, the detection unit 220 determines whether there is a change in an amount that is greater than or equal to a predetermined amount in the second monitoring region in the opposite direction to that in the first monitoring region.

In step S703, the detection unit 220 determines whether each of the number of pixels counted in the first monitoring region and the number of pixels counted in the second monitoring region is greater than a predetermined number. The predetermined number is a fixed number of pixels. The predetermined number can be determined using any method. For example, the predetermined number can be expressed as a percentage with respect to the pixels contained in the first and second monitoring regions. In step S703, if the number of pixels counted in at least one of the monitoring regions is smaller than or equal to the predetermined number (NO in step S703), then in step S704, the detection unit 220 determines that there is no sudden change involving no movement of the object in the result of detection by the range image sensor 103. Then, the detection unit 220 executes step S304 and subsequent steps in FIG. 3.

On the other hand, in step S703, if both of the number of pixels counted in the first monitoring region and the number of pixels counted in the second monitoring region are larger than the predetermined number (YES in step S703), then in step S705, the detection unit 220 determines that there is a sudden change involving no movement of the object in the result of detection by the range image sensor 103. Then, the detection unit 220 executes step S312 and subsequent steps in FIG. 3.

In the above-described example, the number of pixels with the amount of change in the distance value that is a positive value and greater than or equal to the predetermined threshold value is counted in the first monitoring region 601, and the number of pixels with the amount of change in the distance value that is a negative value and greater than or equal to the predetermined threshold value is counted in the second monitoring region 602. The amount of change in the distance value in one of the first and second monitoring regions 601 and 602 is positive while the amount of change in the distance value in the other one of the first and second monitoring regions 601 and 602 is negative. In other words, the number of pixels with the amount of change in the distance value that is negative and greater than or equal to the threshold value is counted in the first monitoring region 601, and the number of pixels with a difference in the distance value that is positive and greater than or equal to the threshold value is counted in the second monitoring region 602.

In the case illustrated in FIG. 8, two predetermined regions in the change amount determination image are set as monitoring regions, and the number of pixels with the amount of change in the distance value that is greater than or equal to the predetermined threshold value is counted in each of the two monitoring regions. The method of calculating the amount of change in the monitoring regions in step S303 is not limited to the method illustrated in FIG. 8. For example, the amount of change in distance in one region in the change amount determination image is monitored to detect a sudden change involving no movement of the object or the hand 102 of the user in the result of detection by the range image sensor 103. FIG. 9 illustrates a process performed in such a case. The differences from FIG. 8 are described with reference to FIG. 9.

In step S700, if it is determined that the hand region is within the monitoring region (YES in step S700), then in step S800, the detection unit 220 counts the number of pixels with the amount of change that is positive and greater than or equal to the predetermined threshold value, based on the change amount determination image generated in step S302.

In step S801, the detection unit 220 determines whether the number of pixels counted in step S800 is larger than a predetermined number. The predetermined number is, for example, a number that is determined in advance, such as 25% of the pixels contained in the monitoring region. If the number of counted pixels is smaller than or equal to the predetermined number (NO in step S801), then in step S704, the detection unit 220 determines that there is no sudden change involving no movement of the object in the result of detection by the range image sensor 103. Then, the processing proceeds to step S304 in FIG. 3, and step S304 and subsequent steps are executed. On the other hand, if the number of counted pixels is larger than the predetermined number (YES in step S801), then in step S705, the detection unit 220 determines that there is a sudden change involving no movement of the object in the result of detection by the range image sensor 103. Then, the processing proceeds to step S312 in FIG. 3, and step S312 and subsequent steps are executed.

FIG. 9 illustrates the case where the pixels in the monitoring region with the amount of change in the distance value that is a positive value and greater than or equal to the threshold value are counted. Alternatively, the pixels in the monitoring region with the amount of change in the distance value that is a negative value and greater than or equal to the threshold value may be counted in step S800. Alternatively, the detection unit 220 can obtain for each pixel the absolute value of the amount of change in the distance value based on the change amount determination image, and the number of pixels with the absolute value of the amount of change in the distance value that is not smaller than the predetermined threshold value is counted in step S800.

[Description of Correction Value Image Calculation Processing]

Next, the touch input recognition processing executed by the calculation unit 214 in step S311 in FIG. 3 will be described below, with reference to FIGS. 4 and 5.

Figure 5:
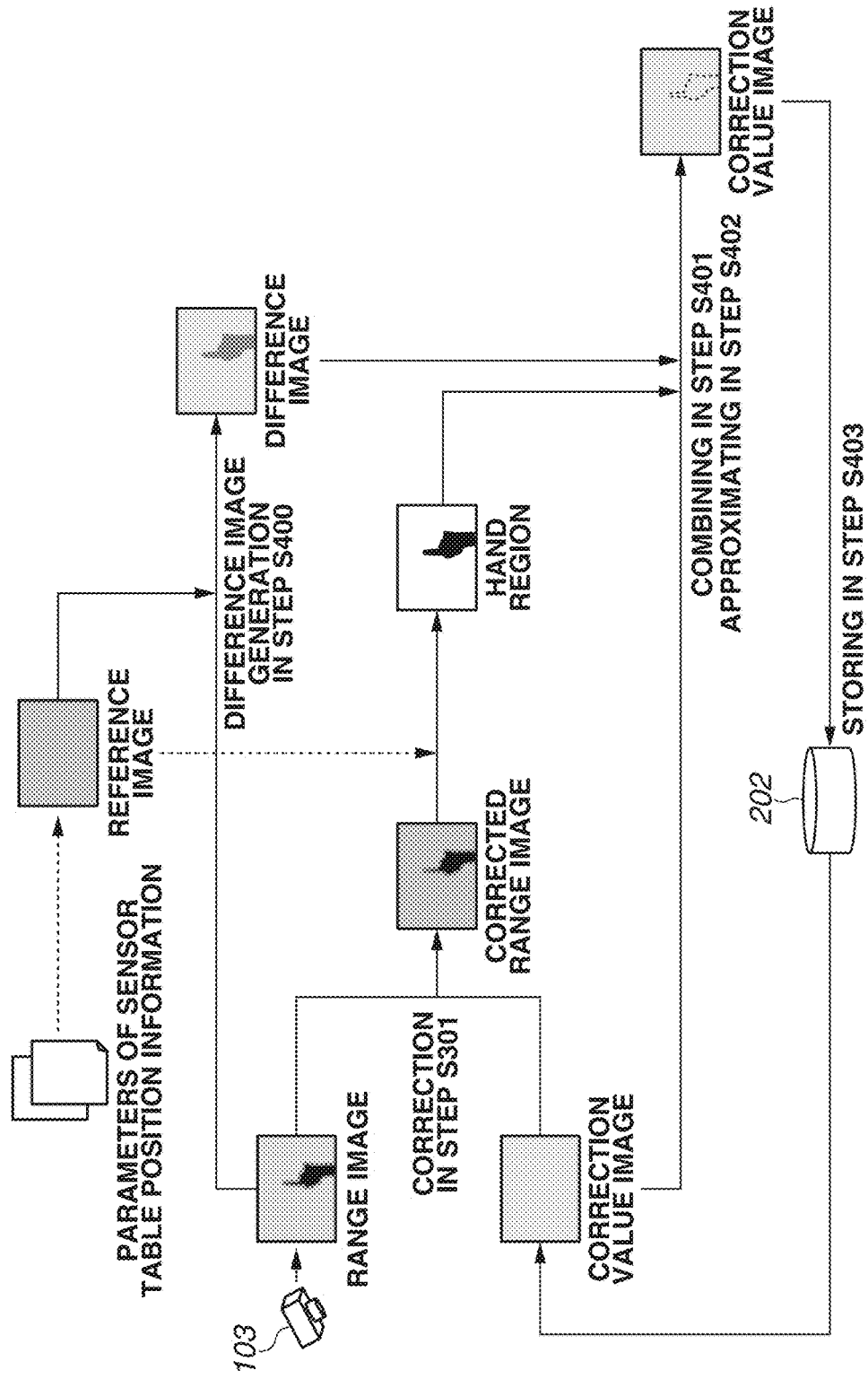
FIG. 5 illustrates an example of a process of range image correction and correction value image calculation according to the first exemplary embodiment.

FIG. 5 schematically illustrates the process executed by the calculation unit 214 in step S311 according to the first exemplary embodiment.

First, the process of calculating a correction value image will be described below with reference to FIG. 5.

The calculation unit 214 obtains differences in distance values between the range image captured by the range image sensor 103 and the reference image to generate a difference image.

Meanwhile, the correction unit 211 corrects the range image of the present frame based on the range image captured this time by the range image sensor 103 and the correction value image calculated when the range image of the frame before is acquired. The identification unit 213 identifies as the hand region a region in the foreground that is located at a distance from the flat surface 101 that is greater than or equal to the threshold value obtained after the execution of the processing in step S303, using the corrected range image.

The calculation unit 214 generates a correction value image in which the differences between the range image and the reference image are canceled with respect to the regions other than the hand region in the difference image using the difference image and the hand region. At this time, the hand region is approximated based on the correction values of the regions other than the hand region to calculate a correction value image. The correction value image calculation method with respect to the hand region is not limited to the above-described method. For the hand region, the same correction values as those in the correction value image of the frame before can be used. Thereafter, the correction unit 211 stores the generated correction value image in the RAM 202.

In this way, the correction value image is generated. The generated correction value image is used in the correction of a range image of the next frame.

Figure 4:
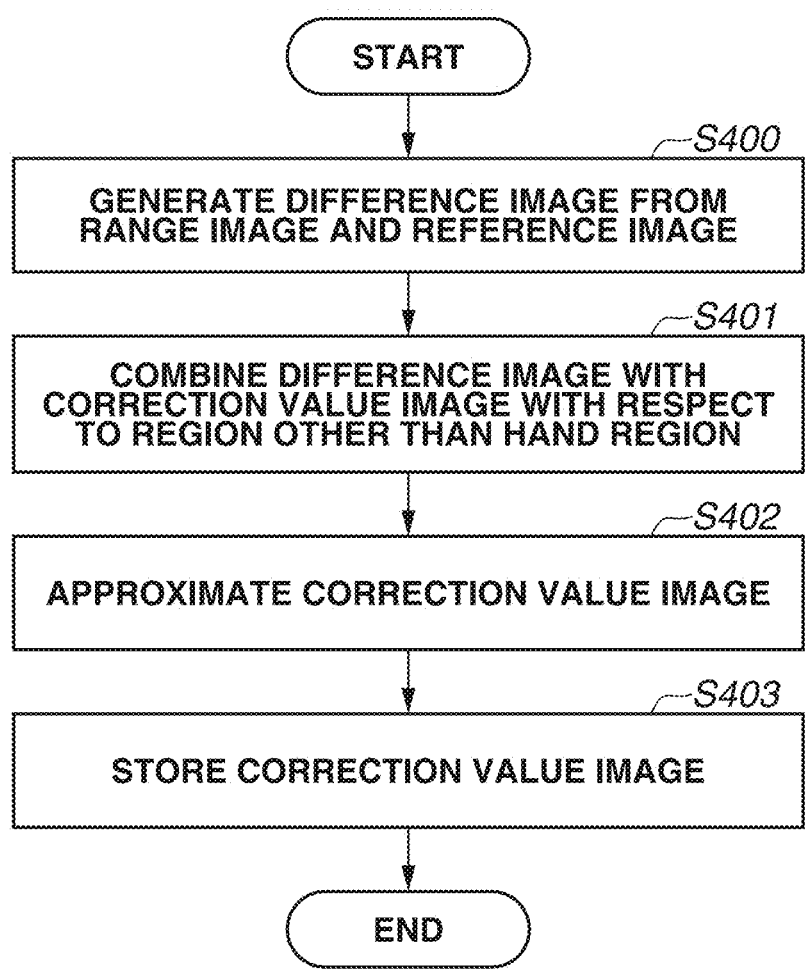
FIG. 4 is a flow chart illustrating an example of a process of calculating a correction value image according to the first exemplary embodiment.

The following describes the process of correction value image calculation with reference to FIG. 4. FIG. 4 is a flow chart illustrating the process of correction value image calculation according to the first exemplary embodiment. The process illustrated in the flow chart in FIG. 4 is started in response to the execution of the processing for identifying the hand region in the range image in step S313 or in response to the change to the UI image projected on the flat surface 101 in step S310. A program for the process illustrated in the flow chart in FIG. 4 is stored in the storage device 203, and the CPU 200 executes the program to realize the process.

In step S400, the calculation unit 214 generates a difference image from the range image acquired in step S300 and the reference image acquired in step S302.

In step S401, the calculation unit 214 combines the difference image calculated in step S400 with the correction value image with respect to the regions other than the hand region identified in the corrected range image in step S305 or S313. The calculation unit 214 detects the hand region from the correction value image used in step S301 using the threshold value determined in step S304 or S312, and overwrites the correction values of the pixels of the regions other than the hand region based on the difference image calculated in step S400. At this time, the correction values of the correction value image are overwritten so as to cancel the differences detected in the difference image calculated in step S400. The combining method is not limited to the above-described method. For example, the pixel values of the difference image and the pixel values of the original correction value image are weighted and added to prevent an extreme change in the correction values caused by sudden noise.

In step S402, the calculation unit 214 approximates the correction value image on the flat surface with respect to the hand region in the correction value image. This makes it possible to obtain correction values for the hand region the pixel values of which are not updated in the correction value image. The present exemplary embodiment is not limited to the approximating on the flat surface and, for example, the correction value image can be approximated on any surface other than a flat surface. For example, in the case where spatial characteristics of range measurement errors are logically or empirically known, the correction value image can be approximated on any curved surface based on the known spatial characteristics. The correction values of the pixels corresponding to the hand region are interpolated from the correction values of the neighboring pixels so that a deterioration in the correction values of the regions other than the hand region that is caused by the approximating on the flat surface is prevented.

In step S403, the correction unit 211 stores the correction value image in the RAM 202. The stored correction value image is used in the touch input recognition processing on the next frame in step S301.

Further, while the correction value image is combined with the difference image with respect to the regions other than the hand region in step S401 in the above-described example, this does not apply to a system in which an object other than the hand 102 of the user can exist on the flat surface 101. In step S304 or S312, the region of an object other than the hand 102 of the user is also identified in the range image, and then the difference image of the regions other than the hand region and the object region is combined with the correction value image in step S401. This enables accurate calculation of the correction value image even in the case where the object exists.

According to the present exemplary embodiment, the monitoring regions are set in the change amount determination image obtained from the range images captured by the range image sensor at regular time intervals, and whether the amount of change over time in the distance values measured in the monitoring regions satisfies the predetermined condition is determined. Based on the determination result, whether there is a sudden change involving no movement of the object or the hand of the user in the result of detection by the range image sensor is determined. If it is determined that there is a sudden change involving no movement of the object or the hand of the user in the result of detection by the range image sensor, the information processing apparatus does not execute the processing for the item displayed on the flat surface. This prevents execution of the processing for the item projected on the flat surface according to the result of detection by the range image sensor when there is no movement of the object or the hand of the user.

<Other Exemplary Embodiment>

In the first exemplary embodiment, the case where no user operation recognition is performed if there is a sudden change involving no movement of the object or the hand of the user in the range image sensor prior to the execution of tap operation recognition processing is described. Alternatively, in the case where there is a sudden change involving no movement of the object or the hand of the user in the result of detection by the range image sensor, the user operation recognition is performed, and the processing corresponding to the user operation does not have to be executed.

In the first exemplary embodiment, the range image sensor 103 and the projector 104 are included in a single information processing apparatus 100. Alternatively, the range image sensor 103 and the projector 104 can be connected to the information processing apparatus 100 via an input/output interface so that the information processing apparatus 100, the range image sensor 103, and the projector 104 cooperate to execute processing as an information processing system.

Further, the information processing apparatuses described in the present specification are also realizable by executing the following processing. Specifically, software (program) configured to realize the functions according to the above-described exemplary embodiment is supplied to a system or apparatus via a network or various storage media, and a computer (or CPU, micro processing unit (MPU), etc.) of the system or apparatus reads and executes the program to execute the processing. In this case, the computer program and the storage medium that stores the computer program are included in the scope of the present invention.

The information processing apparatuses according to the exemplary embodiments described in the present specification are prevented from determining a sudden change as a user operation and executing processing in the case where there is a sudden change in the result of detection by the range image sensor when there is no change in the position of the hand of the user or the object.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-188406, filed Sep. 27, 2016, which is hereby incorporated by reference herein in its entirety.

What is claimed is:

1. An information processing apparatus configured to display an image on a flat surface, the information processing apparatus comprising:
   a memory storing instructions; and
   at least one processor acting as the following units according to the stored instructions:
   a first acquisition unit configured to acquire range information about a distance from an image capturing unit to each of a plurality of points on the flat surface;
   a second acquisition unit configured to acquire an amount of change in the range information with respect to each of the plurality of points on the flat surface using range information acquired by the first acquisition unit at a first time and range information acquired by the first acquisition unit after a predetermined time elapses since the range information is acquired at the first time; and
   a reception unit configured to receive a user input to a screen displayed on the flat surface, wherein the reception unit does not receive a user input to a screen displayed on the flat surface in accordance with a predetermined condition about the amount of change acquired by the second acquisition unit in a predetermined region of the flat surface.

2. The information processing apparatus according to claim 1,
   wherein the predetermined region includes a first region and a second region, and
   wherein the processor further comprising:
   a first storage unit configured to store a number of points on the flat surface with the acquired amount of change which is positive and greater than or equal to a predetermined amount in the first region; and
   a second storage unit configured to store a number of points on the flat surface with the acquired amount of change which is negative and greater than or equal to the predetermined amount in the second region,
   wherein the predetermined condition is that each of the number of points on the flat surface which is stored in the first storage unit and the number of points on the flat surface which is stored in the second storage unit is greater than a predetermined number.

3. The information processing apparatus according to claim 1, the processor further comprising a storage unit configured to store a number of points on the flat surface with the acquired amount of change which has a predetermined sign and is greater than or equal to a predetermined amount in the predetermined region,
   wherein the predetermined condition is that the number of points on the flat surface which is stored in the storage unit is greater than a predetermined number.

4. The information processing apparatus according to claim 1, the processor further comprising a projection unit configured to project a screen onto the flat surface.

5. The information processing apparatus according to claim 1, wherein the recognition unit detects a region where a distance between the flat surface and an object in an image capturing region is greater than a predetermined distance, based on the range information acquired by the first acquisition unit.

6. The information processing apparatus according to claim 5, wherein in a case where the amount of change which is acquired by the second acquisition unit does not satisfy a predetermined condition, the recognition unit detects a region located at a greater distance from the flat surface than a first threshold value, and in a case where the amount of change in the range information satisfies the predetermined condition, the recognition unit detects a region located at a greater distance from the flat surface than a second threshold value which is greater than the first threshold value.

7. The information processing apparatus according to claim 6, wherein the second threshold value is greater than a maximum value of the amount of change which is acquired by the second acquisition unit.

8. An information processing apparatus configured to display an image on a flat surface, the information processing apparatus comprising:
   a memory storing instructions; and
   at least one processor acting as the following units according to the stored instructions:
   a first acquisition unit configured to acquire range information about a distance from an image capturing unit to each of a plurality of points on the flat surface;
   a second acquisition unit configured to acquire an amount of change in the range information acquired by the first acquisition unit with respect to each of the plurality of points on the flat surface using first range information acquired by the first acquisition unit and second range information acquired by the first acquisition unit after a predetermined time elapses since the first range information is acquired; and
   a receiving unit configured to receive a user input to the image displayed on the flat surface;
   a control unit configured to execute processing corresponding to the user input received by the receiving unit;
   wherein the control unit does not execute processing corresponding to the user input received by the receiving unit in accordance with the amount of change acquired by the second acquisition unit.

9. A method of controlling an information processing apparatus configured to display an image on a flat surface and execute processing according to user input to the image, the method comprising:
   acquiring range information about a distance from an image capturing unit to each of a plurality of points on the flat surface;
   acquiring an amount of change in the acquired range information with respect to each of the plurality of points on the flat surface using range information acquired by the range information acquiring at a first time and range information acquired by the range information acquiring after a predetermined time elapses since the range information is acquired at the first time; and
   receiving no user input to the image displayed on the flat surface in a case where the acquired amount of change in a predetermined region of the flat surface satisfies a predetermined condition, and receiving a user input to the image displayed on the flat surface in a case where the acquired amount of change does not satisfy the predetermined condition.

10. A method of controlling an information processing apparatus configured to display an image on a flat surface and execute processing according to user input to the image, the method comprising:
    acquiring range information about a distance from an image capturing unit to each of a plurality of points on the flat surface;
    acquiring an amount of change in the acquired range information with respect to each of the plurality of points on the flat surface using first range information and second range information acquired after a predetermined time elapses since the first range information is acquired; and
    receiving a user input to the image displayed on the flat surface; and
    executing processing corresponding to the user input;
    wherein in accordance with the acquired amount of change in a predetermined region of the flat surface, not receiving the user input.

11. A non-transitory storage medium storing a method of controlling an information processing apparatus configured to display an image on a flat surface and execute processing according to user input to the image, the method comprising:
    acquiring range information about a distance from an image capturing unit to each of a plurality of points on the flat surface;
    acquiring an amount of change in the acquired range information with respect to each of the plurality of points on the flat surface using range information acquired by the range information acquiring at a first time and range information acquired by the range information acquiring after a predetermined time elapses since the first range information is acquired at the first time; and
    receiving a user input to the image displayed on the flat surface; and
    wherein in accordance with the acquired amount of change in a predetermined region of the flat surface, not receiving a user input to the image displayed on the flat surface.

12. A non-transitory storage medium storing a method of controlling an information processing apparatus configured to display an image on a flat surface and execute processing according to user input to the image, the method comprising:
    acquiring range information about a distance from an image capturing unit to each of a plurality of points on the flat surface;
    acquiring an amount of change in the acquired range information with respect to each of the plurality of points on the flat surface using first range information acquired by the range information acquiring and second range information acquired by the range information acquiring after a predetermined time elapses since the first range information is acquired; and
    receiving a user input to the image displayed on the flat surface; and
    wherein in accordance with the acquired amount of change in a predetermined region of the flat surface, not receiving a user input to the image displayed on the flat surface.

* * * * *